Nov. 7, 1967  J. S. ELLARD, JR., ET AL  3,351,027
SHOCK RESISTANT, VIBRATION ISOLATING PLATFORM
Filed March 23, 1966                              2 Sheets-Sheet 1
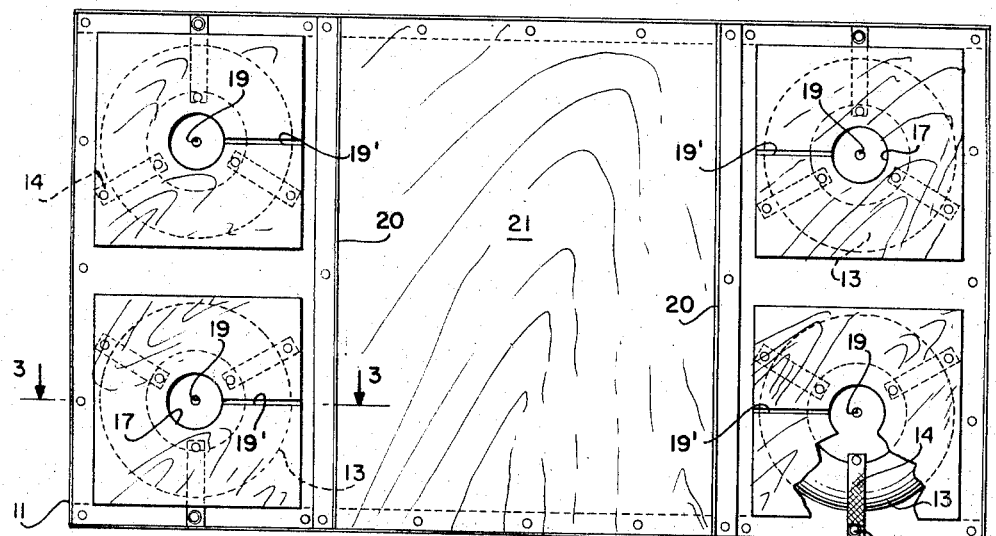
FIG_1
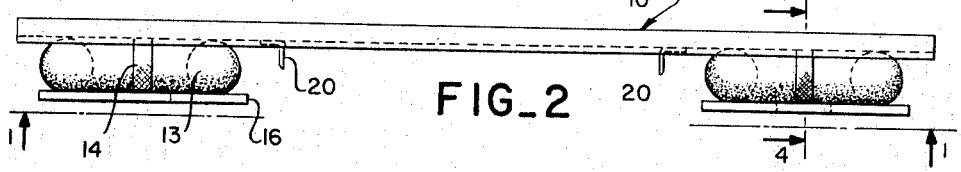
FIG_2
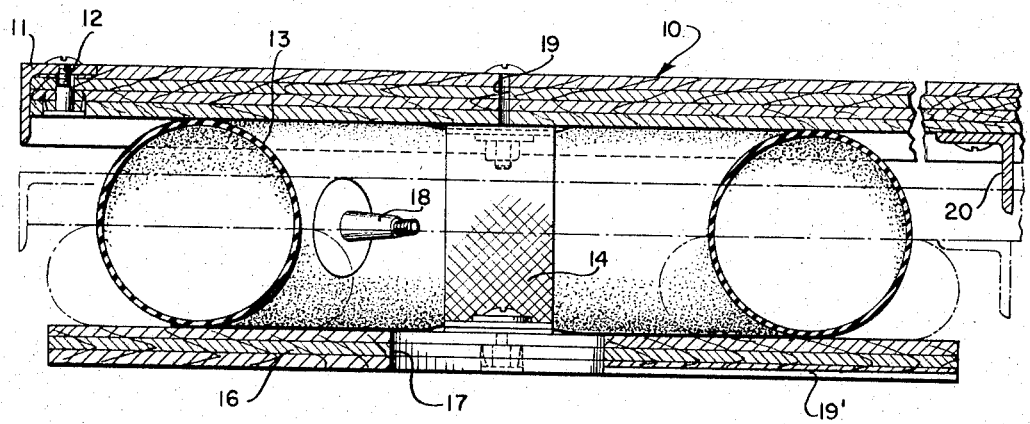
FIG_3
INVENTORS
JAMES SHELBY ELLARD, JR.
BRUCE A. PAIGE
BY George C. Sullivan
Agent Nov. 7, 1967  J. S. ELLARD, JR., ETAL  3,351,027
SHOCK RESISTANT, VIBRATION ISOLATING PLATFORM
Filed March 23, 1966  2 Sheets-Sheet 2
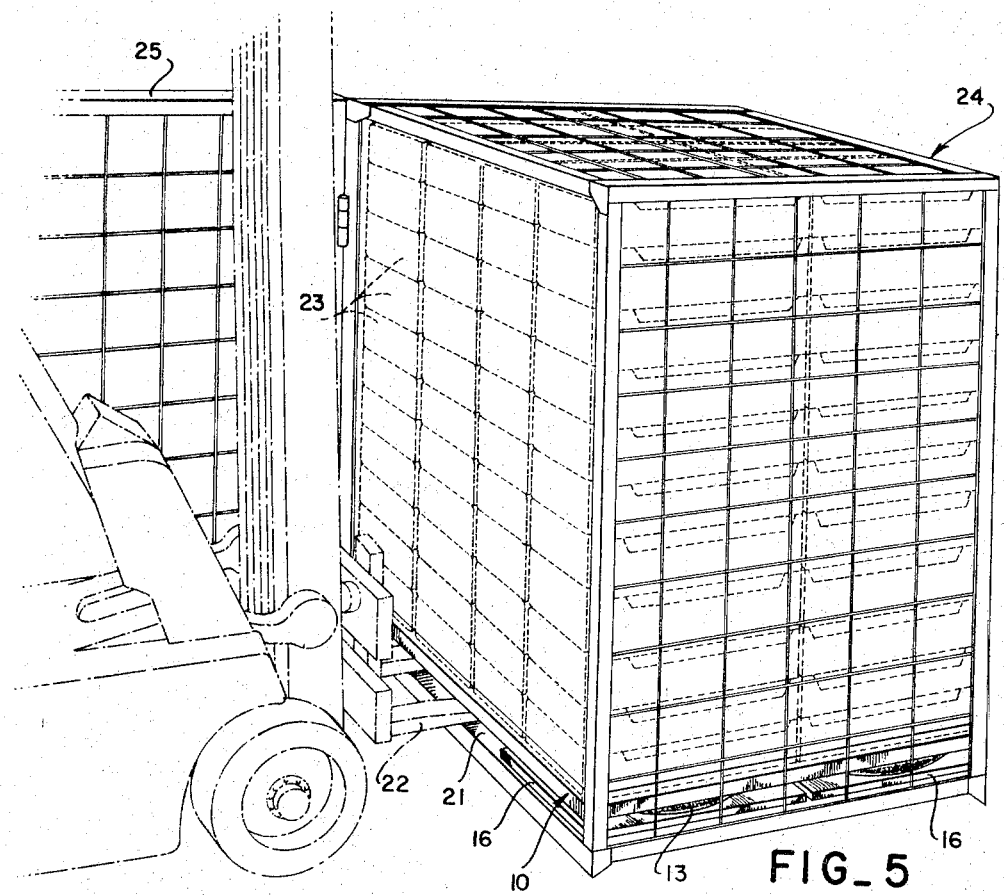
FIG_5
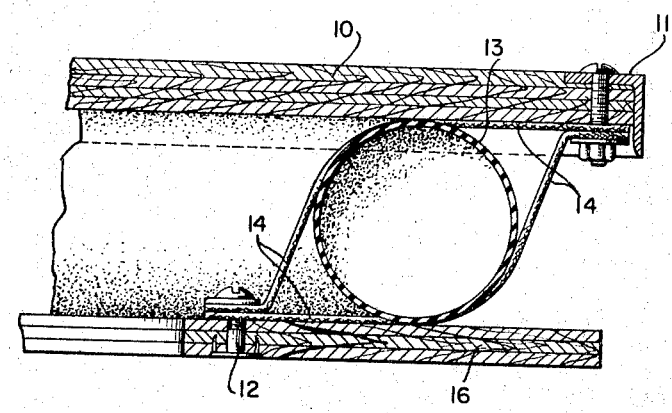
FIG_4
INVENTORS
JAMES SHELBY ELLARD, JR.
BRUCE A. PAIGE
BY George Sullivan
Agent

United States Patent Office 3,351,027
Patented Nov. 7, 1967

---

3,351,027
SHOCK RESISTANT, VIBRATION ISOLATING PLATFORM
James Shelby Ellard, Jr., and Bruce A. Paige, Atlanta, Ga., assignors to Lockheed Aircraft Corporation, Burbank, Calif.
Filed Mar. 23, 1966, Ser. No. 536,768
8 Claims. (Cl. 108—51)

This invention relates generally to energy absorbing or cushioning devices and more particularly to a shock resistant, vibration isolating platform adapted to support and suspend a fragile load so as to protect it against injury and/or damage.

While the present invention has general application and utility in the support of loads, it offers special advantages when so employed during the movement and shipment of fragile goods and equipment, such as, for example, glassware, electronic and electrical mechanisms, and even the more delicate items such as fruits that are easily bruised.

In the transportation business damage to goods and cargo is common both in the on-and-off loading operation and during transit onboard the carrier whether freight car, truck, aircraft, boat or similar vehicle. In order to minimize such damage, special packaging techniques have been developed. Among these is the unitized package concept which comprises a relatively large crate or cage of selected dimensions adapted to make maximum use of the volume or capacity of the carrier and in which multiple smaller packages, boxes, and sundry containers are designed to most efficiently fit. These smaller units may thereby be prepacked in cubicles or cages for subsequent rapid on-loading during which the cages serve to protect such units against abuse and damage. During transit or shipment onboard the carrier the cages also offer protection to the goods against the usual jolts and bumps of collision with each other and the side walls of the carrier.

The instant invention has in view improvements to this cargo shipping art by the provision of a shock resistant and vibration isolating support adapted to be interposed between the carrier and the goods and/or equipment being transported. This support lends itself to use in the unitized package concept referred to above. It is especially characterized by its inexpensive, rugged construction, being capable of withstanding rough handling normal to loading and shipping operations. At the same time, it includes desirable features; for example, it is adjustable to accommodate a relatively wide range of weights and load distributions, it is adapted for handling by conventional power equipment usually employed in on-and-off vehicle loading, etc.

The above and other objects and advantages of the invention will become more apparent in the light of the description that follows and wherein a preferred embodiment of the invention is set forth in detail with specific reference to the accompanying drawings in which:

FIGURE 1 is a bottom view (taken along the line 1—1 of FIGURE 2) of a platform constructed in accordance with the teachings hereof to show the general organization and arrangement of the several parts thereof;

FIGURE 2 is a side elevation thereof;

FIGURE 3 is a section taken along line 3—3 of FIGURE 1 and further shows in phantom lines the position of the platform under load;

FIGURE 4 is a section taken along line 4—4 of FIGURE 2; and

FIGURE 5 is a perspective view of the platform as it would be applied to a conventional cargo cage.

Referring more particularly to the drawings 10 designates a rigid generally rectangular sheet, preferably plywood or like material, which forms the upper surface of the platform. The perimeter of the sheet 10 is preferably reinforced and protected by an angle 11 in which case the marginal edges of the sheet 10 is recessed to receive and accommodate each angle 11 whereby the outer surface of such angle forms a continuation of the surface of the sheet 10. Thus disposed, the several angles 11 are permanently secured to the sheet, preferably through standard bolt and T-nut connections 12. The side of each angle 11 that defines the edge surface of the sheet 10 is substantially longer than the thickness of the sheet 10 to thereby extend beyond the limits thereof and serve as a side protector as will be more apparent hereinafter.

On the underlying surface of the sheet 10 in selected localized areas, preferably at or adjacent each corner thereof, is provided an inflatable annular tube 13, the equivalent of a conventional innertube for automobile tires. An appropriate number of bands 14, preferably of woven nylon webbing, are employed to secure each tube 13 to the sheet 10. To this end, each band encircles one of the tubes 13, and its opposite ends brought together and secured to sheet 10 through appropriate fastener means, such as a standard nut and bolt or the like. An eyelet or grommet may be employed following known practice to protect each band in the area of the fastener or bolt 12. The length of each band 14 is such that a medial portion thereof may be extended beyond the tube 13 and bolted through suitable means such as a T-bolt 12 to a protective base plate 16 associated with each tube 13 in opposition to the sheet 10. Each plate 16 has dimensions slightly larger than the diameter of its tube 13 to ensure confinement of the tube 13 within the borders of the plate 16 at all times during its operation.

At its center, each plate 16 is pierced by an opening 17 for access to the center of the associated tube 13 and the valve 18 thereof whereby the air pressure within the tube is adjusted. If desired, an escape hole 19 may be provided in the sheet 10 in alignment with the underlying opening 17 to permit the free passage of air therethrough when the tube is compressed. Preferably, however, this is accomplished by a slot 19′ in each plate 16 which extends from the central opening 17 therein outward to the edge of the plate.

On the under surface of the sheet 10 adjacent the inner edges of the plates 16 so as to be transversely disposed on the sheet 10 is a pair of spaced angles 20 the depending sides of which serve as a defining side wall of the associated tubes 13. The angles 20 thus spaced serve to define a central or medial area 21 of the platform to permit access thereto by conventional power equipment such as the forks 22 of a lift truck. This facilitates handling of the platform when loaded or stacked with goods such as cases 23 in and around storage areas as well as the loading thereof into a cargo cage 24. These cargo cages 24 have removable doors 25 through which the stacked platform passes and which may be thereafter closed to snugly contain the stacked cargo in a unitized package ready for shipment.

While a specific embodiment of the invention has been hereinabove illustrated and described, various changes thereto will be apparent to those skilled in the art. The appended claims set forth the true spirit and scope of the invention and are intended to cover all such changes and equivalents so as to define the sole limits of the invention.

What is claimed is:

1. A shock resistant, vibration isolated platform comprising a rigid load-bearing surface, a plurality of discrete, annular, airtight, inflatable and deflatable members underlying said surface and disposed in a predetermined localized area thereof, a rigid base plate individual to and underlying each said member, a plurality of bands associated with each of said members, said bands being disposed in pairs each secured at opposite ends to said surface and adjacent base plate with the medial portions of each said pair coacting one with the other by extending around opposite sides of and substantially encircling said associated member when inflated and disposed as aforesaid to thereby maintain the otherwise unconnected surface, plates and members in a unitary assembly, and a valve individual to each of said members to facilitate the adjustment thereof and establish the load-resisting forces of localized areas of said surface.

2. The platform of claim 1 wherein each said base plate has dimensions greater than the corresponding dimensions of the adjacent member.

3. The platform of claim 1 wherein said surface is pierced by a vent opening in communication with the space defined by each said member.

4. The platform of claim 1 wherein said surface is rectangular and one said member is located adjacent each corner thereof.

5. The platform of claim 1 including an angular frame secured to said surface at and along its margin and edge face with one side depending therefrom to form a defining side of the platform.

6. The platform of claim 1 wherein said members are located adjacent remote edges of said surface defining a medial unobstructed area.

7. The platform of claim 6 including a rigid projection depending from said surface proximate the adjacent sides of said members and defining said area.

8. The platform of claim 1 wherein each said member is a rubber tube, each said valve is located adjacent the inner periphery of its tube, and each said base plate has dimensions greater than the outside diameter of its adjacent tube with an opening piercing the central portion thereof to permit access to each valve.

References Cited

UNITED STATES PATENTS

| | | |
|---|---|---|
| 2,774,503 | 12/1956 | Moore. |
| 3,028,981 | 4/1962 | Ford et al. |
| 3,090,331 | 5/1963 | McCann _____ 108—51 |
| 3,106,174 | 10/1963 | Newton _____ 108—54 X |
| 3,121,401 | 2/1964 | Fields. |
| 3,145,853 | 8/1964 | Langenberg. |
| 3,225,919 | 12/1965 | Swingle. |
| 3,267,882 | 8/1966 | Rapson et al. _____ 108—51 |
| 3,276,530 | 10/1966 | Borneman. |

FOREIGN PATENTS

| | | |
|---|---|---|
| 241,793 | 11/1962 | Australia. |
| 1,364,719 | 5/1964 | France. |

DAVID J. WILLIAMOWSKY, *Primary Examiner.*

FRANK B. SHERRY, *Examiner.*

G. O. FINCH, *Assistant Examiner.*